(No Model.)
G. A. METCALF & N. HICKS.
MECHANICAL MOVEMENT.
No. 276,264. Patented Apr. 24, 1883.
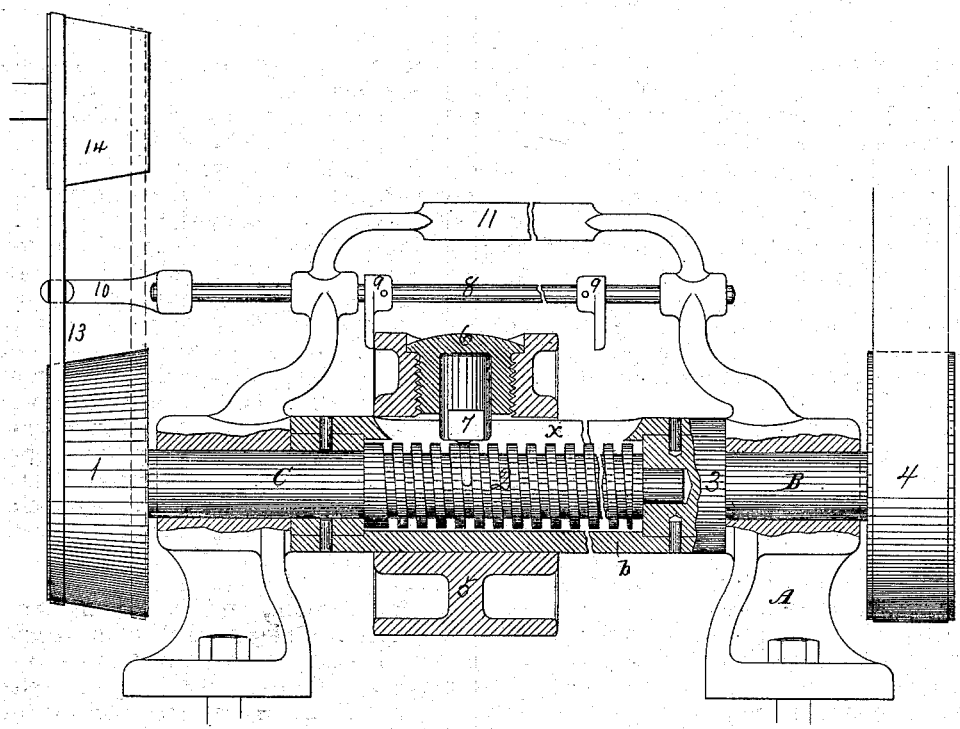

UNITED STATES PATENT OFFICE.

GEORGE A. METCALF, OF WOONSOCKET, RHODE ISLAND, AND NEHEMIAH HICKS, OF ATTLEBOROUGH, MASSACHUSETTS.

MECHANICAL MOVEMENT.

SPECIFICATION forming part of Letters Patent No. 276,264, dated April 24, 1883.

Application filed December 13, 1882. (No model.)

*To all whom it may concern:*

Be it known that we, GEORGE A. METCALF and NEHEMIAH HICKS, citizens of the United States, and residents, respectively, of Woonsocket, Providence county, Rhode Island, and Attleborough, Bristol county, Massachusetts, have jointly invented certain new and useful Improvements in Mechanical Movements, of which the following is a specification.

Our invention is a mechanical movement intended to impart a rotary motion to a grinding disk, pulley, or tool of any kind, and to cause it simultaneously to travel longitudinally.

In the drawing, the figure is a part-sectional elevation of a grinding-machine illustrating our invention.

The frame A is of any suitable character, and the tool 5 is a tool-head or pulley—as, for instance, a grindstone, buffer or emery wheel, cutter-head, or other tool, or a gear or pulley for imparting motion to a tool, according to the character of the work to be performed.

The driving-shaft B turns in bearings in the frame, has a driving-pulley, 4, at one end, and is formed into a sleeve or shell, *b*, to receive the end of a feed-shaft, C, which also turns in bearings on the frame, and within the hollow shaft B is provided with a screw-thread, 2, the end of the shaft C having a bearing in a socket in the head of the shaft B. On the end of the shaft C is a cone-pulley, 1, round which a belt, 13, passes to a cone-pulley, 14, on a second driving-shaft. A swiveled projection or traveler, 7, carried by the tool 5, enters the threads of the screw 2 through a slot, *x*, in the sleeve or shell *b*, which prevents any turning of the tool on the shell, but permits it to move longitudinally under the action of the screw. A rod, 8, carrying a belt-shifter, 10, slides in bearings of the frame A, and has two tappets, 9 9, arranged to be struck by the tool as it reaches the limit of its longitudinal movement in either direction. The tool derives its rotary motion from that of the shaft B, and will remain in its position on said shaft so long as the shaft C moves with and rotates at the same speed as the shaft B; but if the motion of the shaft C is arrested or retarded, the traveler 7 will be carried in the thread of the screw 2, and the tool will be moved longitudinally in one direction. If, on the contrary, the shaft C is turned at a greater speed than the shaft B, the tool will be carried longitudinally on the shaft in the opposite direction.

Different devices may be used for imparting the rotary motion to the shaft C, which may be under the control of any suitable governing appliances. An automatic regulating arrangement is that shown in the drawing, the tool striking the tappets 9 alternately, and shifting the belt on the cone-pulley so that the shaft C will be driven first at a greater and then at a less speed than the shaft B, so as to impart a regular travel to the tool back and forth upon the shaft, and this may be so regulated that the tool will travel slowly in one direction and rapidly in the other. We thus secure a reciprocating motion without the use of the ordinary cross-threaded screws.

We claim—

1. The combination, with a driving-shaft carrying a tool or pulley capable of longitudinal motion thereon, of a second shaft provided with a screw-thread receiving a traveler on the tool, and appliances for rotating the second shaft independently of the first, substantially as set forth.

2. The combination of the slotted driving-shaft B, carrying a head, 5, provided with a traveler, 7, a shaft, C, threaded to receive the traveler, and carrying one of a pair of cone-pulleys, and a belt-shifter arranged to shift the belt on said cone-pulleys as the tool approaches the limit of its movement in either direction.

3. The combination of the shaft B, carrying the traveling head 5, the screw-shaft C, and means for driving the latter at different speeds, and a shifting device whereby the speed of the shaft C is changed as the head reaches the limit of its movement in either direction.

In testimony whereof we have signed our names to this specification in the presence of two subscribing witnesses.

GEORGE A. METCALF.
NEHEMIAH HICKS.

Witnesses:
ELIJAH R. READ,
GEO. A. ADAMS.